United States Patent
Furukawa

(10) Patent No.: US 10,026,155 B1
(45) Date of Patent: Jul. 17, 2018

(54) IMAGE-PROCESSING APPARATUS

(71) Applicant: OLYMPUS CORPORATION, Hachioji-shi, Tokyo (JP)

(72) Inventor: Eiji Furukawa, Saitama (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 15/847,285

(22) Filed: Dec. 19, 2017

Related U.S. Application Data

(63) Continuation of application No. PCT/JP2017/020086, filed on May 30, 2017.

(51) Int. Cl.
G06T 5/00 (2006.01)
G06T 11/60 (2006.01)

(52) U.S. Cl.
CPC .............. *G06T 5/002* (2013.01); *G06T 11/60* (2013.01)

(58) Field of Classification Search
None
See application file for complete search history.

(56) References Cited

U.S. PATENT DOCUMENTS

| | | | |
|---|---|---|---|
| 2009/0232216 A1 | 9/2009 | Kurata | |
| 2009/0285301 A1 | 11/2009 | Kurata | |
| 2010/0157072 A1 | 6/2010 | Luo et al. | |
| 2011/0235942 A1 | 9/2011 | Luo et al. | |
| 2012/0281758 A1* | 11/2012 | Orlick | H04N 19/105 375/240.14 |
| 2014/0176794 A1* | 6/2014 | Fujishiro | H04N 7/0132 348/441 |

FOREIGN PATENT DOCUMENTS

| | | | | |
|---|---|---|---|---|
| EP | 2101486 A2 | | 9/2009 | |
| JP | 2001016594 A | * | 1/2001 | |
| JP | 2009219082 A | * | 9/2009 | .............. H04N 5/144 |
| JP | 4506875 B2 | | 7/2010 | |
| JP | 2010147985 A | * | 7/2010 | .............. H04N 5/145 |
| JP | 2011199716 A | * | 10/2011 | .............. G06T 5/003 |

OTHER PUBLICATIONS

Written Opinion dated Aug. 22, 2017 issued in International Application No. PCT/JP2017/020086.
English translation of the Written Opinion dated Aug. 22, 2017 issued in International Application No. PCT/JP2017/020086.

* cited by examiner

*Primary Examiner* — Delomia L Gilliard
(74) *Attorney, Agent, or Firm* — Holtz, Holtz & Volek PC

(57) ABSTRACT

An image-processor includes: a discrete-motion-vector calculator calculating motion vectors of individual measurement regions and confidences thereof based on a standard image and a reference image or a combined image generated based on the reference image; a global-vector calculator separately calculating, based on the motion vectors and the confidences thereof, a global vector of the standard image, a confidence thereof, a local vector of a processing target region in the standard image, and a confidence of the local vector; a local-vector interpolator; a local-vector-confidence interpolator; a motion-vector selector selecting the local vector or the global vector based on at least one of the local vector, the confidence thereof, the global vector, and the confidence thereof; a motion-compensated-image generator generating, based on the selected vector, a motion-compensated image of the reference image or the combined image; and a blender weighted adding the processing target region and the motion-compensated image.

9 Claims, 13 Drawing Sheets

| DISCRETE MOTION VECTOR (Vx, Vy) | | FREQUENCY NUMBER | FREQUENCY PROPORTION | |
|---|---|---|---|---|
| ↗ | Vx=2, Vy=-2 | 22 | 22/35 | ← GLOBAL VECTOR |
| ↑ | Vx=0, Vy=-1 | 6 | 6/35 | |
| ↖ | Vx=-2, Vy=-2 | 2 | 2/35 | |
| ↘ | Vx=2, Vy=-2 | 1 | 1/35 | |

DISCRETE MOTION VECTOR CORRESPONDING
TO PERIPHERAL POSITION

| MEASUREMENT-REGION POSITION | DISCRETE MOTION VECTOR (Vx, Vy) | | CONFIDENCE LOW:0← →64:HIGH |
|---|---|---|---|
| UPPER LEFT | ← | Vx=-10, Vy=0 | 64 |
| UPPER RIGHT | ← | Vx=-10, Vy=0 | 50 |
| LOWER LEFT | ← | Vx=-10, Vy=0 | 60 |
| LOWER RIGHT | ← | Vx=-10, Vy=0 | 55 |

⇩ INTERPOLATION   ⇩ INTERPOLATION

| LOCAL VECTOR (Vx, Vy) | | CONFIDENCE LOW:0← →64:HIGH |
|---|---|---|
| ← | Vx=-10, Vy=0 | 57 |

⇩

LOCAL-VECTOR SELECTION

DISCRETE MOTION VECTOR CORRESPONDING
TO PERIPHERAL POSITION

| MEASUREMENT-REGION POSITION | DISCRETE MOTION VECTOR (Vx, Vy) | | CONFIDENCE LOW:0← →64:HIGH |
|---|---|---|---|
| UPPER LEFT | ← | Vx=-10, Vy=0 | 50 |
| UPPER RIGHT | ↓ | Vx=0, Vy=6 | 4 |
| LOWER LEFT | ← | Vx=-10, Vy=0 | 64 |
| LOWER RIGHT | ↗ | Vx=4, Vy=-4 | 3 |

INTERPOLATION ⇓     INTERPOLATION ⇓

| LOCAL VECTOR (Vx, Vy) | | CONFIDENCE LOW:0← →64:HIGH |
|---|---|---|
| ← | Vx=-4, Vy=0 | 30 |

⇓ LOBAL-VECTOR SELECTION

FIG. 9

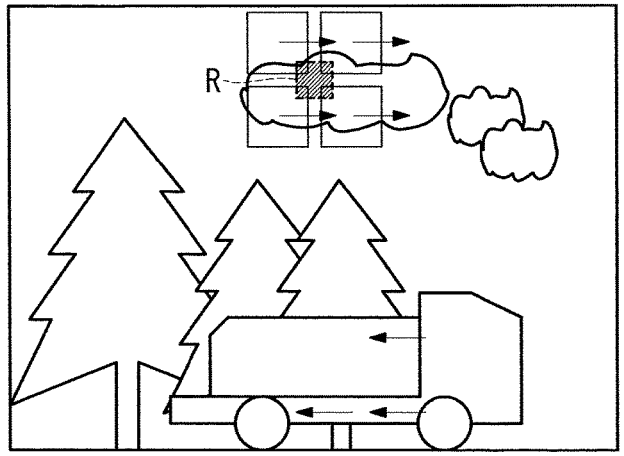

DISCRETE MOTION VECTOR CORRESPONDING
TO PERIPHERAL POSITION

| MEASUREMENT-REGION POSITION | DISCRETE MOTION VECTOR (Vx, Vy) | CONFIDENCE LOW:0← →64:HIGH |
|---|---|---|
| UPPER LEFT | → Vx=6, Vy=0 | 64 |
| UPPER RIGHT | → Vx=5, Vy=0 | 50 |
| LOWER LEFT | → Vx=5, Vy=0 | 60 |
| LOWER RIGHT | → Vx=5, Vy=0 | 55 |

| LOCAL VECTOR (Vx, Vy) | CONFIDENCE LOW:0← →64:HIGH |
|---|---|
| → Vx=6, Vy=0 | 64 |

INTERPOLATION     INTERPOLATION

| LOCAL VECTOR (Vx, Vy) | CONFIDENCE LOW:0← →64:HIGH |
|---|---|
| ← Vx=5, Vy=0 | 57 |

Vx DIFFERENCE= | 5 − 6 | =1
Vy DIFFERENCE= | 0 − 0 | =0

LOBAL-VECTOR SELECTION

CORRECT LOCAL-VECTOR INTERPOLATION CONFIDENCE
57+OFFSET (−30) =27
LOBAL-VECTOR SELECTION

IMAGE-PROCESSING APPARATUS

CROSS-REFERENCE TO RELATED APPLICATIONS

This is a continuation of International Application PCT/JP2017/020086, with an international filing date of May 30, 2017, which is hereby incorporated by reference herein in its entirety.

TECHNICAL FIELD

The present invention relates to an image-processing apparatus, and, in particular, relates to frame-recursive noise reduction in which noise is reduced by combining a plurality of images.

BACKGROUND ART

One known video-image noise removal method in the related art is recursive noise reduction (for example, see Patent Literatures 1 and 2). In Patent Literatures 1 and 2, on the basis of a standard image and a reference image that is acquired immediately before the standard image, a global vector of the standard image and a local vector of a target block in the standard image are calculated, and two motion-compensated images are generated by executing motion compensation by separately using the global vector and the local vector. Also, correlations between the standard image and the individual motion-compensated images are calculated, and, by combining the standard image with the motion-compensated image having a greater correlation, a noise-reduced standard image is generated.

CITATION LIST

Patent Literature

{PTL 1} Publication of Japanese Patent No. 4645736
{PTL 2} Publication of Japanese Patent No. 4506875

SUMMARY OF INVENTION

An object of the present invention is to provide an image-processing apparatus with which it is possible to decrease the access traffic to a frame memory while performing recursive noise reduction.

Solution to Problem

An aspect of the present invention is an image-processing apparatus that generates a combined image by performing blending of a plurality of images acquired in time series, the image-processing apparatus including: a discrete-motion-vector calculating portion that sets a plurality of discrete measurement regions in a standard image and a reference image that is acquired before the standard image or a combined image generated on the basis of the reference image, and that calculates motion vectors separately for the plurality of measurement regions and confidences of the motion vectors; a global-vector calculating portion that calculates, on the basis of the motion vectors and the confidences thereof calculated by the discrete-motion-vector calculating portion, a global vector that indicates a motion of the standard image as a whole and a confidence of the global vector; a local-vector interpolating portion that calculates, on the basis of the plurality of motion vectors calculated by the discrete-motion-vector calculating portion, a local vector of a processing target region in the standard image; a local-vector-confidence interpolating portion that calculates, on the basis of the confidences of the plurality of motion vectors calculated by the discrete-motion-vector calculating portion, a confidence of the local vector of the processing target region; a motion-vector selecting portion that selects one of the local vector and the global vector on the basis of at least one of the global vector, the global-vector confidence, the local vector, and the local-vector confidence; a motion-compensated-image generating portion that generates, on the basis of the vector selected by the motion-vector selecting portion, a motion-compensated image of the reference image or the combined image corresponding to the processing target region in the standard image; and a blending portion that performs weighted addition of the processing target region in the standard image and the motion-compensated image.

In the above-described aspect, the motion-vector selecting portion may be provided with: a local-vector-threshold setting portion that sets a threshold for the local-vector confidence; and a vector determining portion that selects the local vector if the local-vector confidence is equal to or greater than the threshold, and selects the global vector if the local-vector confidence is less than the threshold.

In the above-described aspect, the local-vector-threshold setting portion may set the threshold to be a predetermined value.

In the above-described aspect, the local-vector-threshold setting portion may correct the threshold on the basis of the confidence or a magnitude of the global vector or both the confidence and the magnitude of the global vector.

In the above-described aspect, the local-vector-threshold setting portion may correct the threshold on the basis of the global-vector confidence and a difference between the global vector and the local vector.

In the above-described aspect, the vector determining portion may correct the local-vector confidence on the basis of the global-vector confidence and a difference between the global vector and the local vector.

In the above-described aspect, the discrete-motion-vector calculating portion may be provided with: an image-size reducing portion that reduces the sizes of the standard image and the reference image or the combined image; wherein the motion vectors and the confidences thereof are calculated on the basis of the standard image reduced by the image-size reducing portion and the reference image or the combined image reduced by the image-size reducing portion.

By doing so, it is possible to suppress the size of the image data to be saved.

BRIEF DESCRIPTION OF DRAWINGS

FIG. 9 is a diagram for explaining another example of calculation of a local vector in the processing target region in the current frame and the confidence thereof.

DESCRIPTION OF EMBODIMENT

An image-processing apparatus according to an embodiment of the present invention and an image-acquisition system provided with the same will be described below with reference to the drawings.

Figure 1:
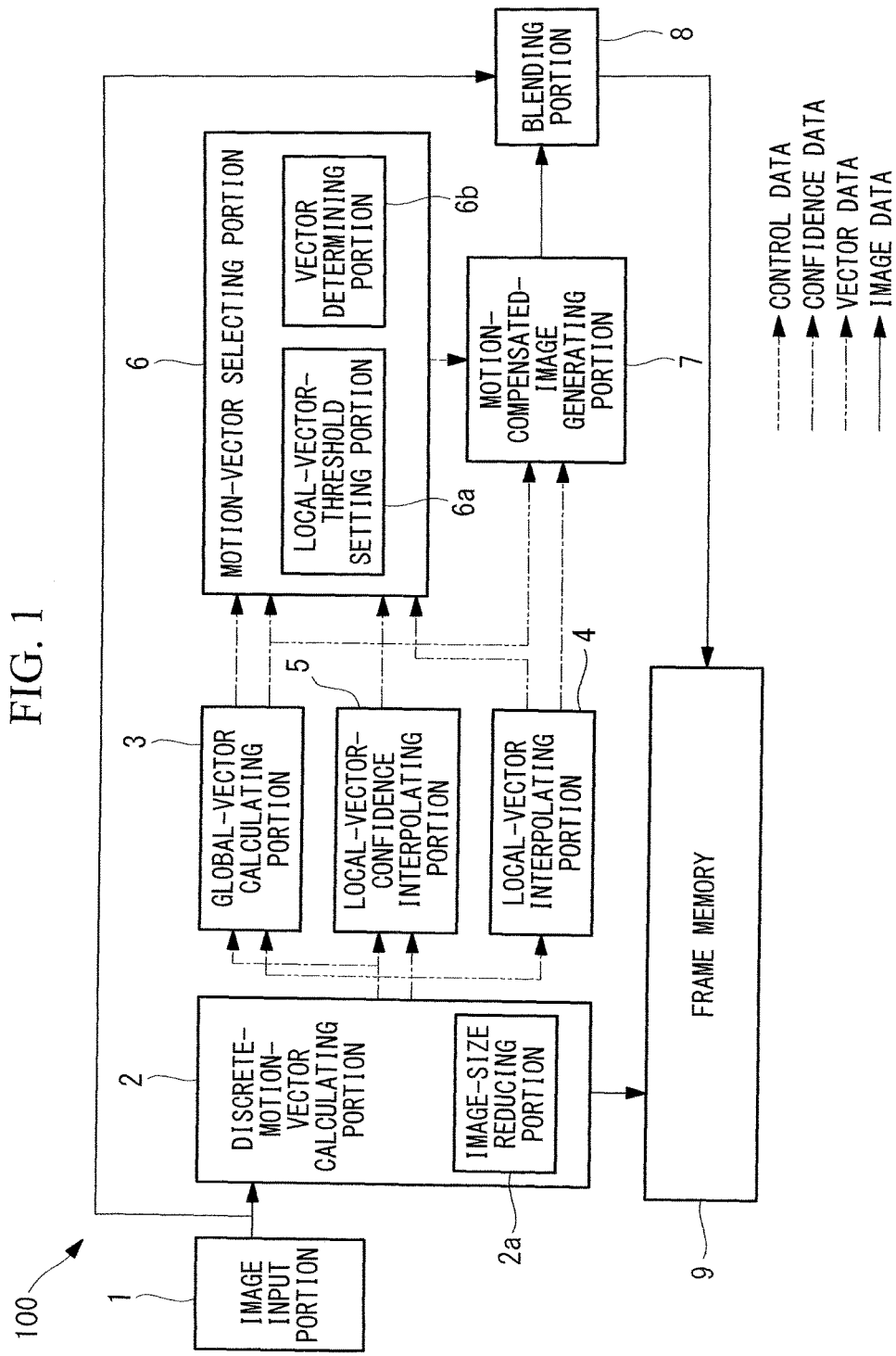
FIG. 1 is an overall configuration diagram of an image-processing apparatus and an image-acquisition system according to an embodiment of the present invention.

An image-acquisition system 100 shown in FIG. 1 is, for example, a digital video camera, a digital still camera, or the like that captures and records a still image or a video image. FIG. 1 shows a block configuration of the image-acquisition system 100.

As shown in FIG. 1, the image-acquisition system 100 is provided with: an image input portion 1 that captures an imaging subject and acquires an image thereof; a discrete-motion-vector calculating portion 2 that calculates a motion vector in a current frame image; a global-vector calculating portion 3 that calculates a global vector in the current frame image and the confidence thereof; a local-vector interpolating portion 4 that calculates a local vector for each processing target region in the current frame image; a local-vector-confidence interpolating portion 5 that calculates the confidence of each local vector; a motion-vector selecting portion 6 that selects one of the global vector and the local vector for each processing target region; a motion-compensated-image generating portion 7 that generates a motion-compensated image for each processing target region on the basis of a frame image acquired immediately before the current frame image; a blending portion 8 that generates, as an output image (combined image), a noise-reduced current frame image by performing blending of the motion-compensated images and the processing target regions in the current frame image; and a frame memory 9 that saves image data required to perform the above-described processing.

The image-processing apparatus is provided with: the discrete-motion-vector calculating portion 2; the global-vector calculating portion 3; the local-vector-confidence interpolating portion 5; the local-vector interpolating portion 4; the motion-vector selecting portion 6; the motion-compensated-image generating portion 7; the blending portion 8; and the frame memory 9.

The image input portion 1 is provided with, for example, an image-acquisition lens that forms an optical image by focusing light coming from the imaging subject and an image-acquisition device that acquires an image by capturing the optical image formed by the image-acquisition lens. The image-acquisition device has, for example, a Bayer array structure, generates Bayer-array RAW data of a frame image and achieves full colorization thereof by demosaicing the RAW data. The image input portion 1 outputs the fully colorized frame-image data to the discrete-motion-vector calculating portion 2 and the blending portion 8. Therefore, a full-color output image is generated in the blending portion 8.

The discrete-motion-vector calculating portion 2 is provided with an image-size reducing portion 2a. The discrete-motion-vector calculating portion 2 outputs, to the frame memory 9, the current frame image (standard image, hereinafter, referred to as "current frame") input thereto from the image input portion 1 and a frame image (reference image, hereinafter, referred to as "past frame") acquired immediately before the current frame in the time direction after reducing the sizes thereof in the image-size reducing portion 2a. To perform the frame reduction, for example, pixel thinning, a bicubic method, or the like is used. Therefore, in the frame memory 9, the reduced current frame and the reduced past frame are saved.

The reduced past frame saved in the frame memory 9 may be a reduced image of a noise-reduced past frame, which is an output image output from the blending portion 8. In this case, the output-image reduction may be performed in one of the blending portion 8 and the image-size reducing portion 2a.

The image input portion 1 may output RAW data to the discrete-motion-vector calculating portion 2 and the blending portion 8 in the original form without performing full colorization thereof. In this case, in the image-size reducing portion 2a of the discrete-motion-vector calculating portion 2, luminance signals Y are generated in a simple manner from the RAW data. For example, the RAW data are converted to data in the YCbCr format by performing colorization by means of demosaicing based on a bilinear method or the like, thus generating the luminance signals Y. Alternatively, by taking an average of signal values of the four, namely, R, Gr, Gb, and B, pixels of the Bayer array, a pseudo luminance signal Y at the center position of the four pixels is generated. Reduction is performed after generating the luminance signals Y in this way.

Figure 2A:
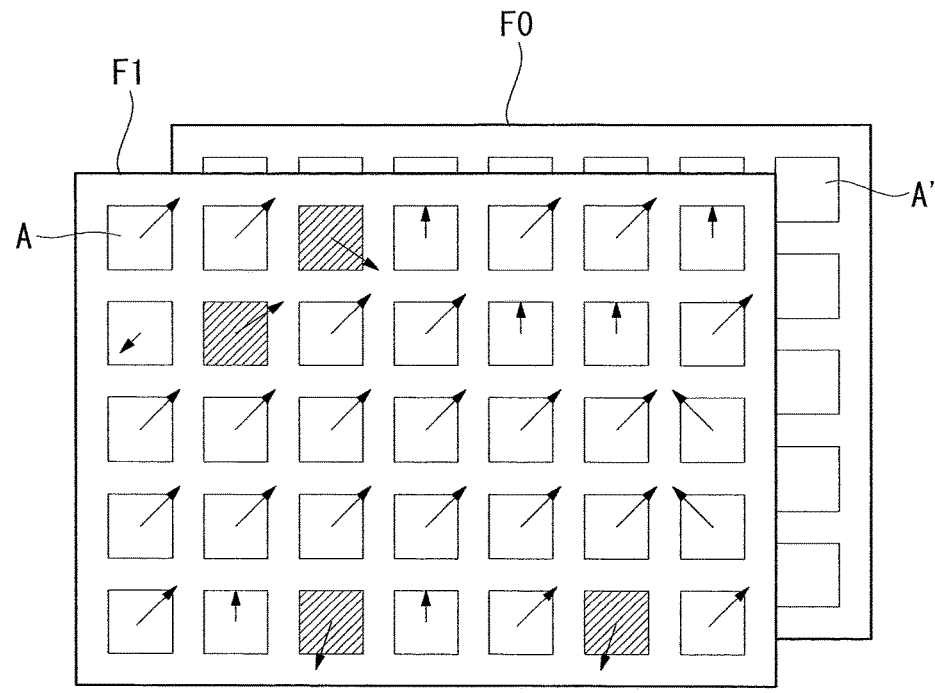
FIG. 2A is a diagram showing measurement regions set in reduced current and past frames and examples of motion vectors in measurement regions in the reduced current frame.
Figure 2B:
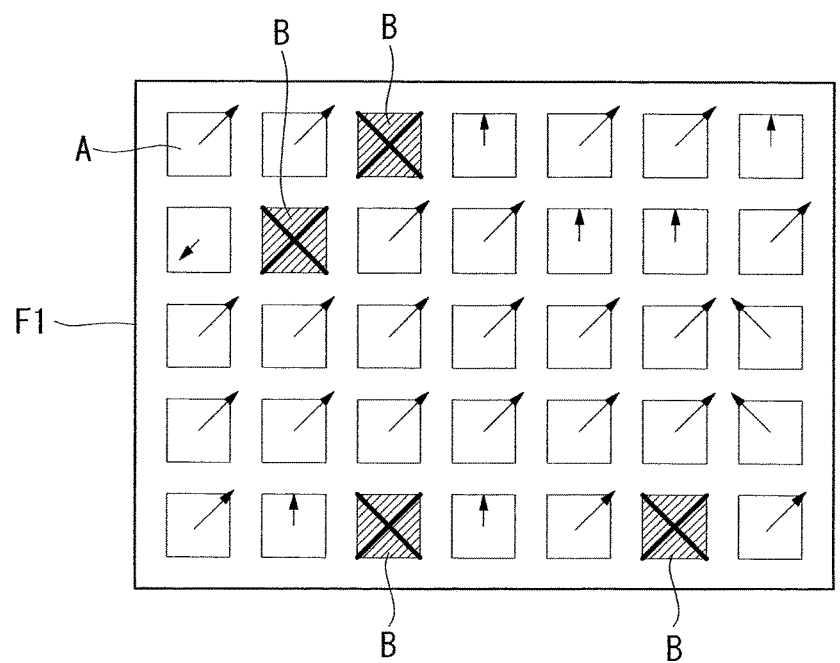
FIG. 2B is a diagram showing an example of the current frame in FIG. 2A after confidence determination.

The discrete-motion-vector calculating portion 2 reads out a reduced current frame F1 and a reduced past frame F0 from the frame memory 9, and calculates, for individual discrete measurement regions A in the current frame F1, motion vectors that represent motions of the imaging subject between the past frame F0 and the current frame F1, as shown in FIG. 2A. Arrows in the measurement regions A in FIGS. 2A and 2B represent the calculated motion vectors.

Specifically, the discrete-motion-vector calculating portion 2 sets, in the current frame F1, the measurement regions A with spacings among them (preferably, equal spacings). In addition, the discrete-motion-vector calculating portion 2 sets, in the past frame F0, measurement regions A' at the same coordinate positions and in the same sizes as the measurement regions A in the current frame F1. Subsequently, the discrete-motion-vector calculating portion 2 computes correlations between the corresponding measurement regions A and A' while shifting the positions of the measurement regions A' in the past frame F0 in a set search area, and calculates the motion vectors (hereinafter, referred to as "discrete motion vectors") between the measurement regions A and A' at a position at which the correlation becomes maximum. To perform correlation computation, for example, block matching based on the SAD (Sum of Absolute Difference) or the SSD (Sum of Squared Difference) is used.

The discrete-motion-vector calculating portion 2 simultaneously calculates the confidence of each of the calculated discrete motion vectors. For example, in the case in which block matching based on the SAD is used to perform correlation computation, the confidence is calculated on the basis of the SAD calculated in the process of performing matching. In block matching, the SAD becomes minimum when the correlation becomes maximum. The discrete-motion-vector calculating portion 2 calculates a difference between the minimum SAD and SAD of a predetermined rank (given by an ordinal number of several tens, for example) counted from lower values of the SAD; and, if the difference is less than a predetermined threshold, the discrete-motion-vector calculating portion 2 determines the region to be a low-contrast region, thus setting the confidence thereof low, and, if the difference is equal to or greater than the threshold, sets the confidence high. In this way, the discrete-motion-vector calculating portion 2 calculates the discrete motion vectors and the confidences thereof together. In FIG. 2B, regions B are low-confidence regions that have been determined to be the low-contrast regions among the measurement regions A. The confidences of the discrete motion vectors may be scalar values calculated on the basis of a difference between the predetermined threshold and the SAD.

The discrete motion vectors and the confidences thereof calculated by the discrete-motion-vector calculating portion 2 are input to the global-vector calculating portion 3. In addition, the discrete motion vectors calculated by the discrete-motion-vector calculating portion 2 are input to the local-vector interpolating portion 4, and the confidences of the discrete motion vectors calculated by the discrete-motion-vector calculating portion 2 are input to the local-vector-confidence interpolating portion 5.

Figures 3, 4A:
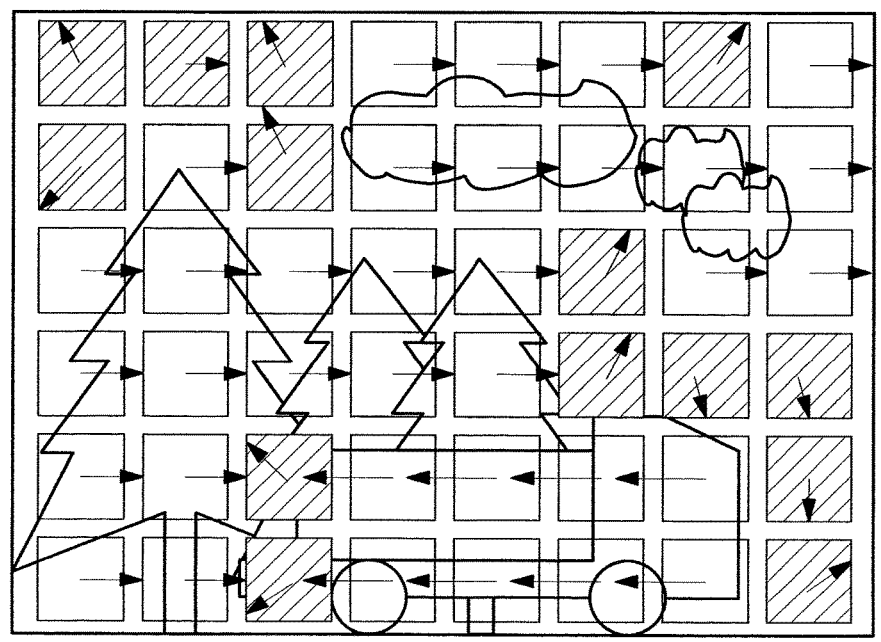
FIG. 3 is a table showing results of statistical processing of the motion vectors in the current frame in FIG. 2B.
FIG. 4A is a diagram showing other examples of the motion vectors in the reduced current frame.

The global-vector calculating portion 3 calculates a global vector that represents the motion of the current frame F1 as a whole and a confidence of the global vector by statistically processing the plurality of discrete motion vectors in the current frame F1 and the confidences thereof. FIG. 3 shows an example of a method of calculating the global vector and the confidence thereof. In the example in FIG. 3, low-confidence discrete motion vectors having confidences that are equal to or less than a predetermined value are excluded, frequencies of the remaining discrete motion vectors are calculated, and a discrete motion vector having the highest frequency is determined to be the global vector. The global-vector confidence is calculated so that, when the frequency of the discrete motion vector having the highest frequency is compared to a threshold, the confidence is increased by the amount by which the frequency exceeds the threshold, and so that the confidence is decreased by the amount by which the frequency falls below the threshold. The global-vector confidence may be a scalar value that is calculated on the basis of a difference between the threshold and the frequency.

The local-vector interpolating portion 4 calculates the local vector of a processing target region set in the current frame by using the discrete motion vectors received from the discrete-motion-vector calculating portion 2. The processing target region may be a small region, such as a 3×3 pixel region or a 9×9 pixel region, or the processing target region may be 1 pixel.

Figure 4B:
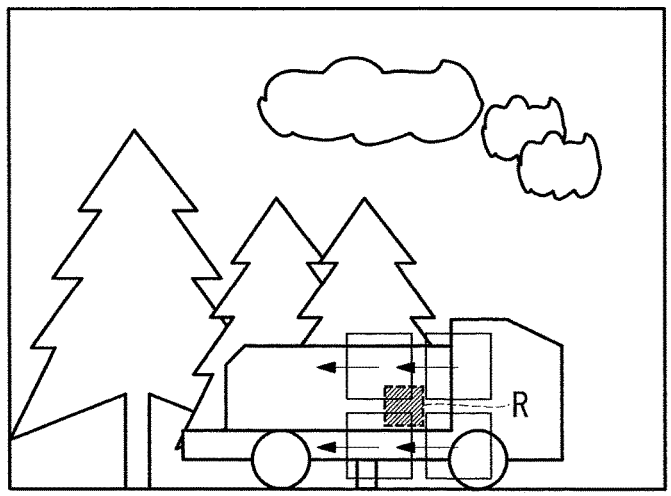
FIG. 4B is a diagram for explaining an example of calculation of a local vector in a processing target region in the current frame and the confidence thereof.
Figure 4C:
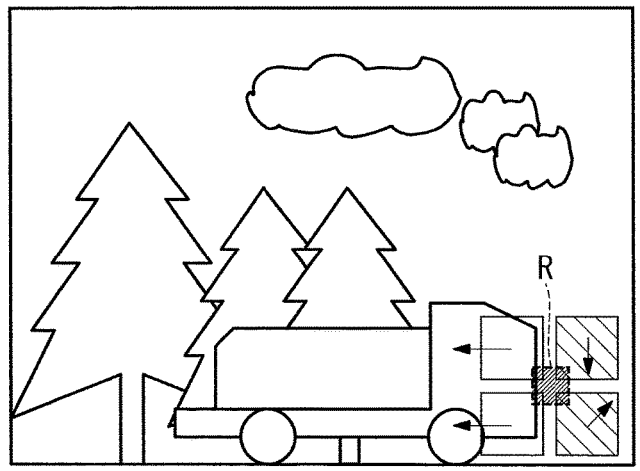
FIG. 4C is a diagram for explaining another example of calculation of a local vector in the processing target region in the current frame and the confidence thereof.

FIG. 4A shows examples of the discrete motion vectors, and FIGS. 4B and 4C show a processing target region R and four discrete motion vectors in the neighborhood of this processing target region R. Vx and Vy are vector components in the horizontal direction (X-direction) and the vertical direction (Y-direction) in the current frame, respectively.

For example, as shown in FIGS. 4B and 4C, the local-vector interpolating portion 4 takes a weighted average of the plurality of discrete motion vectors in the neighborhood of the processing target region R by taking into account the distances between the processing target region R and the individual discrete motion vectors, thereby calculating the local vector of the processing target region R. Alternatively, the local-vector interpolating portion 4 may employ a nearest-neighbor method in which a discrete motion vector that is closest to the processing target region R is determined to be the local vector of the processing target region R.

The local-vector interpolating portion 4 performs the above-described interpolation on the processing target regions R corresponding to all pixels in the current frame.

The local-vector-confidence interpolating portion 5 calculates the confidence of the local vector of the processing target region R by using the confidences of the discrete motion vectors received from the discrete-motion-vector calculating portion 2.

For example, as shown in FIGS. 4B and 4C, the local-vector-confidence interpolating portion 5 takes a weighted average of the confidences of the plurality of discrete motion vectors in the neighborhood of the processing target region R used in calculating the local vector by taking into account the distances between the processing target region R and the individual discrete motion vectors, thereby calculating the local-vector confidence of the processing target region R. Alternatively, the local-vector-confidence interpolating portion 5 may employ a nearest neighbor method in which the confidence of a discrete motion vector that is closest to the processing target region R is determined to be the local-vector confidence of the processing target region R.

The local-vector-confidence interpolating portion 5 performs the above-described processing on all processing target regions R.

In the example in FIG. 4B, all four, namely, upper-left, upper-right, lower-left, and lower-right, discrete motion vectors in the neighborhood of the processing target region R are identical to each other, and the confidences of the respective discrete motion vectors are 64, 50, 60, and 55. Therefore, as a result of taking a weighted average of the four discrete motion vectors in the local-vector interpolating portion 4, a local vector that is identical to the four discrete motion vectors is calculated. In addition, as a result of taking a weighted average of the confidences of the four discrete motion vectors in the local-vector-confidence interpolating portion 5, the local-vector confidence is calculated to be 57.

In the example in FIG. 4C, the upper-left and lower-left discrete motion vectors in the neighborhood of the processing target region R are identical to each other, and the confidences thereof are 50 and 64, respectively. On the other hand, the upper-right discrete motion vector in the neighborhood of the processing target region R points downward and the lower-right discrete motion vector points upper-rightward; and the confidences thereof are 4 and 3, respectively. In other words, because the upper-right and lower-right regions of the processing target region R are low-contrast regions, the confidences thereof are low. Therefore, as a result of taking a weighted average of the four discrete motion vectors in the local-vector interpolating portion 4, a local vector that is different from the actual motion of the processing target region R is calculated. In addition, as a result of taking a weighted average of the confidences of the four discrete motion vectors in the local-vector-confidence interpolating portion 5, the local-vector confidence is calculated to be 30.

The motion-vector selecting portion 6 receives inputs of the global vector and the global-vector confidence from the global-vector calculating portion 3. In addition, the motion-vector selecting portion 6 receives an input of the local vector from the local-vector interpolating portion 4 and an input of the local-vector confidence from the local-vector-confidence interpolating portion 5. The motion-vector selecting portion 6 selects one vector to be used for performing motion compensation for each processing target region R on the basis of at least one of the four types of information, namely, the global vector, the confidence thereof, the local vector, and the confidence thereof.

Specifically, as shown in FIG. 1, the motion-vector selecting portion 6 is provided with: a local-vector-threshold setting portion 6a that sets a threshold for the local-vector confidence; and a vector determining portion 6b that selects one of the local vector and the global vector on the basis of the local-vector confidence and the threshold.

Figure 5:
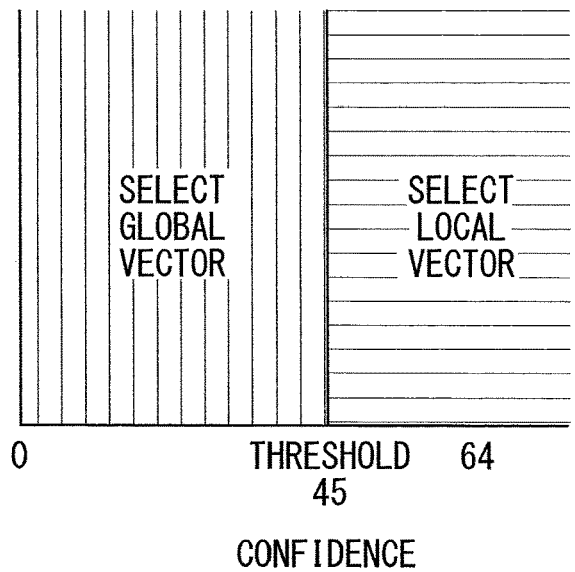
FIG. 5 is a diagram showing the relationship between the local-vector confidence and a vector to be selected.

FIG. 5 shows the relationship between the local-vector confidence and the vector to be selected. The threshold is set in advance to be a predetermined value in the form of, for example, a manufacturer parameter. In the example in FIG. 5, the threshold is 45.

The vector determining portion 6b compares the calculated local-vector confidence to the threshold. As a result of the comparison, if the local-vector confidence is equal to or greater than the threshold, the vector determining portion 6b selects the local vector, and, if the local-vector confidence is less than the threshold, the vector determining portion 6b selects the global vector. Therefore, in the case of the example in FIG. 4A, because the local-vector confidence, 57, is greater than the threshold, 45, the local vector is selected. On the other hand, in the case of the example in FIG. 4B, because the local-vector confidence, 30, is less than the threshold, 45, the global vector is selected.

The information about the result of the vector selection by the vector determining portion 6b is input to the motion-compensated-image generating portion 7 from the motion-vector selecting portion 6.

In accordance with the information about the result of the vector selection received from the motion-vector selecting portion 6, the motion-compensated-image generating portion 7 accesses the past frame saved in the frame memory 9, and generates motion-compensated images to be combined with the individual processing target regions R in the current frame.

Specifically, regarding the processing target regions R in which the local vectors are selected, the motion-compensated-image generating portion 7 positions the processing target regions R with respect to the past frame by using the local vectors, reads out the positioned regions in the past frame from the frame memory 9, and sets the read-out regions to be the motion-compensated images.

On the other hand, regarding the processing target regions R in which the global vectors are selected, the motion-compensated-image generating portion 7 positions the processing target regions R with respect to the past frame by using the global vectors, reads out the positioned regions in the past frame from the frame memory 9, and sets the read-out regions to be the motion-compensated images.

The generated motion-compensated images of the individual processing target regions R are input to the blending portion 8 from the motion-compensated-image generating portion 7.

Figure 6:
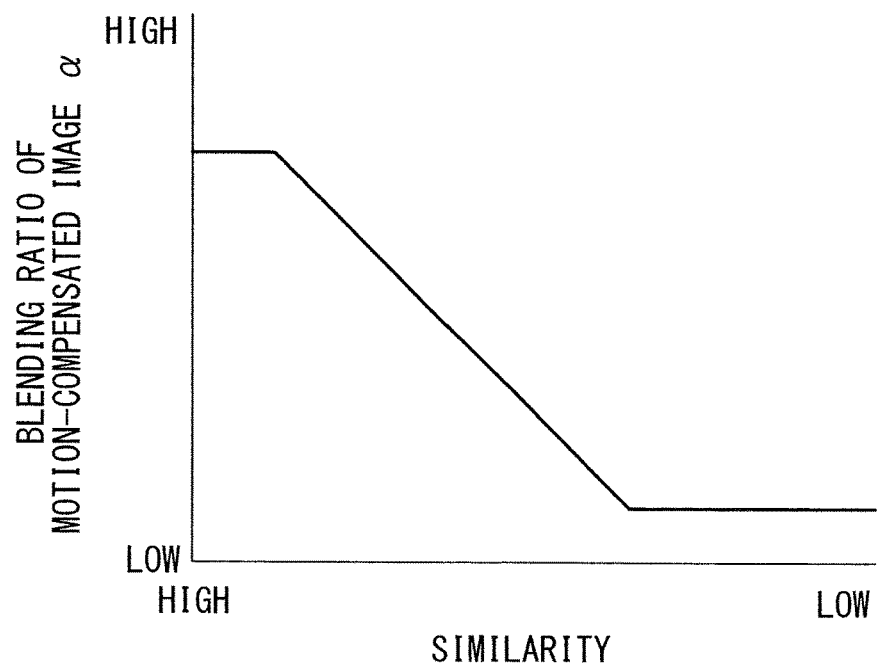
FIG. 6 is a graph showing an example of the relationship between blending ratio and similarity between the processing target region of a standard image and a motion-compensated image.

The blending portion 8 generates an output image, which is a noise-reduced current frame, by performing blending (weighted addition) of the processing target regions R of the current frame received from the image input portion 1 and the motion-compensated images of the past frame received from the motion-compensated-image generating portion 7. When performing blending, the blending portion 8 calculates similarities between the processing target regions R and the motion-compensated images by computing correlations, such as the SAD, calculates blending ratios on the basis of the similarities, and combines the processing target regions R and the motion-compensated images in accordance with the calculated blending ratios. FIG. 6 shows examples of the similarities and the blending ratios. As shown in FIG. 6, the blending portion 8 calculates combining ratios α so that the combining ratios α for the motion-compensated images are increased with an increase in the similarities (with a decrease in the SAD).

Figure 7:
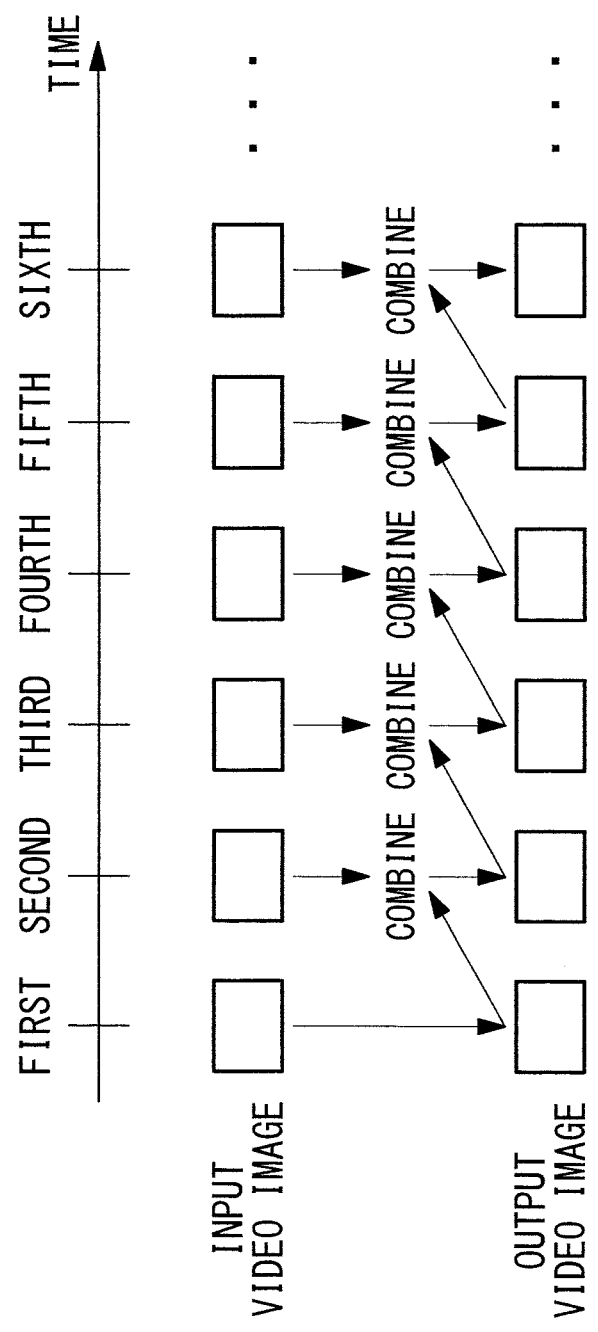
FIG. 7 is a diagram schematically showing a blending-processing sequence.

FIG. 7 shows a sequence of blending processing in terms of an example in which frame-recursive noise reduction is performed on video images. As shown in FIG. 7, when capturing the video images, the first frame image is used as an output image in the original form. Subsequently, a second frame image is captured, and a second output image is generated by combining the saved first output image and the second frame image with respect to each of the processing target regions R by using the set blending ratios α. With the third frame image and thereafter, output images are generated in a similar manner on the basis of the current frame image and an output image generated immediately therebefore.

Figure 8:
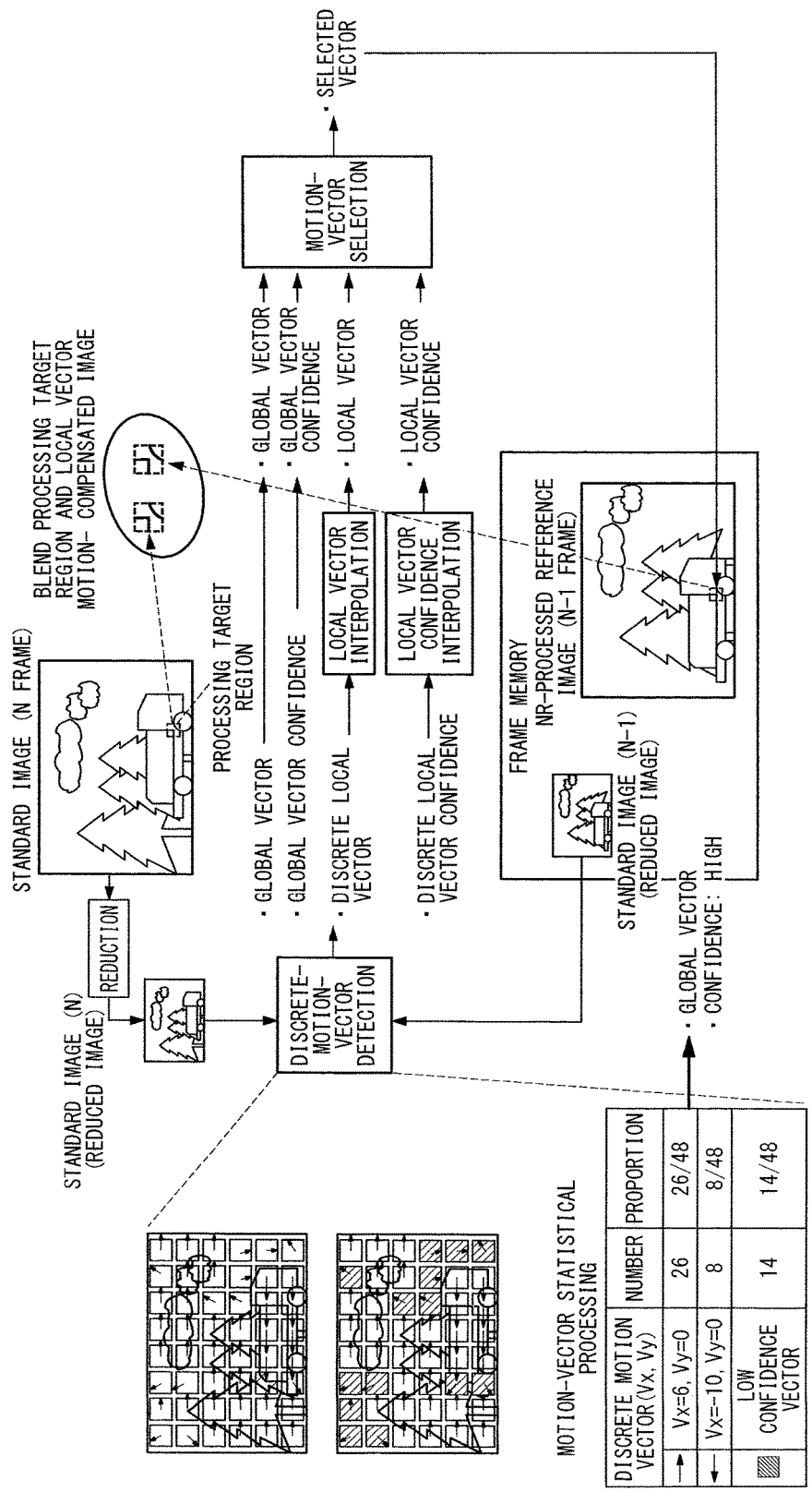
FIG. 8 is a diagram showing an image-processing sequence in the image-processing apparatus in FIG. 1.

Next, the operation of the thus-configured image-processing apparatus and the image-acquisition system 100 provided with the same will be described. FIG. 8 shows an image-processing sequence in the image-processing apparatus.

As shown in FIG. 8, when an Nth round of image capturing is executed in video-image capturing in the image input portion 1, an Nth frame image (N frame), which is a standard image, is input to the image-size reducing portion 2a in the discrete-motion-vector calculating portion 2 from the image input portion 1, the size thereof is reduced in the image-size reducing portion 2a, and the reduced Nth frame image is saved in the frame memory 9.

At this point in time, a saved reduced (N−1)th frame image (N−1 frame) already exists in the frame memory 9. This reduced (N−1)th frame image may be a reduced image of an (N−1)th output image that has already been generated by the blending portion 8. In the discrete-motion-vector calculating portion 2, the discrete motion vectors and the confidences thereof in the plurality of measurement regions A that are discretely set in the reduced Nth frame image are calculated by using the reduced Nth frame image and the reduced (N−1)th frame image.

Next, in the global-vector calculating portion 3, the global vector of the Nth frame image is calculated on the basis of the discrete motion vectors and the confidences thereof. In addition, in the local-vector interpolating portion 4, the local vector of each processing target region R in the Nth frame image is calculated on the basis of the plurality of discrete motion vectors in the neighborhood surrounding the processing target region R. In addition, in the local-vector-confidence interpolating portion 5, the local-vector confidence of each processing target region R in the Nth frame image is calculated on the basis of the confidences of the plurality of discrete motion vectors in the neighborhood surrounding the processing target region R.

Next, in the motion-vector selecting portion 6, on the basis of four types of information, namely, the global vector, the confidence thereof, the local vector, and the confidence thereof, the vector to be used to generate the motion-compensated image for each processing target region R is selected from the global vector and the local vector.

Next, in the motion-compensated-image generating portion 7, the motion-compensated image for each processing target region R is generated, on the basis of the selected vector, from the (N−1)th frame image saved in the frame memory 9.

Next, in the blending portion 8, the blending ratios are calculated on the basis of the similarities between the individual processing target regions R and the motion-compensated images thereof, and the output image is generated by combining the individual processing target regions R and the motion-compensated images in accordance with the calculated blending ratios.

Figure 13:
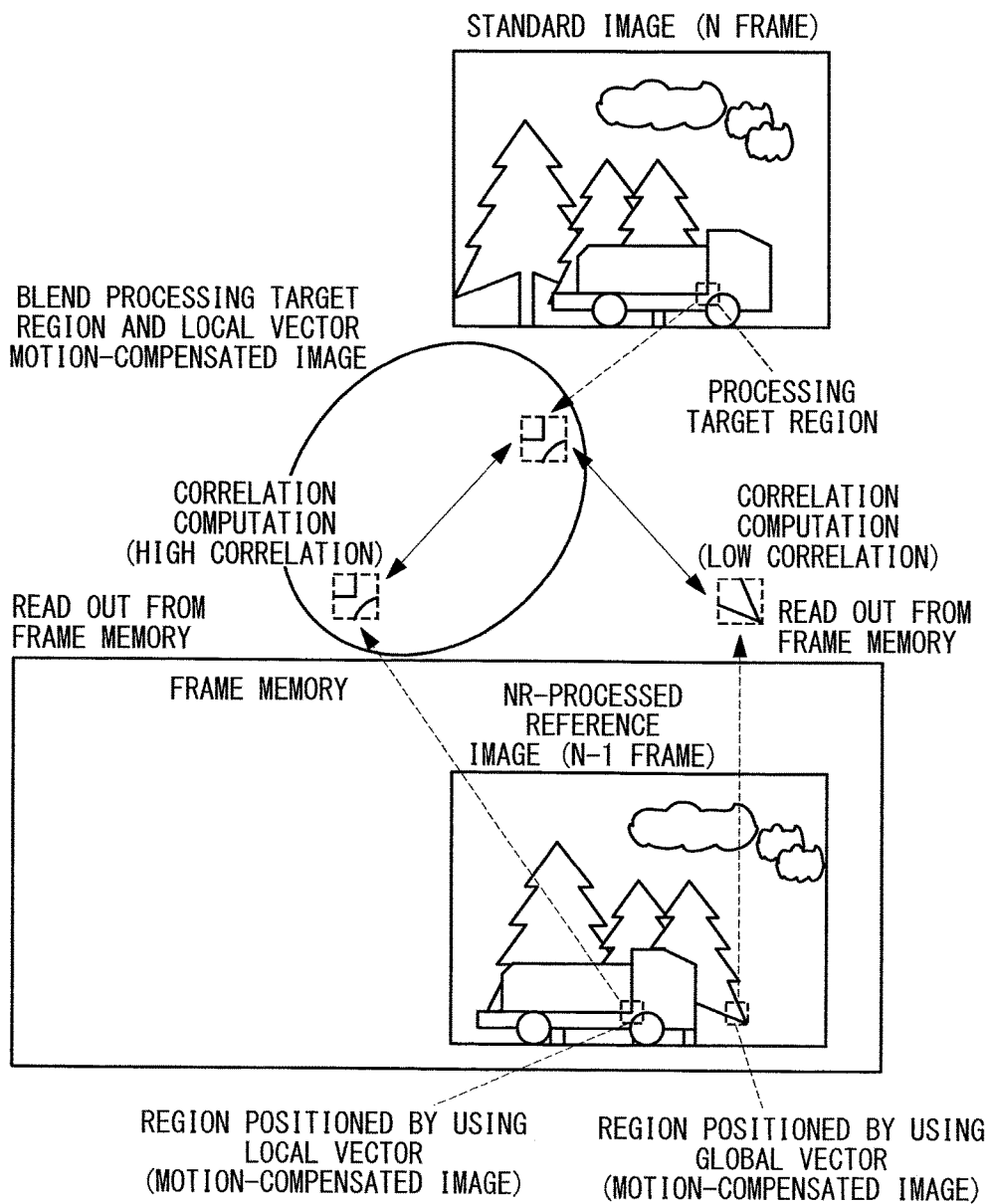
FIG. 13 is a diagram for explaining processing for generating a motion-compensated image according to the related art.

FIG. 13 shows processing for generating motion-compensated images in the related art. In this processing, in the (N−1)th frame image, which is a reference image, two regions that are separately positioned by using the global vector and the local vector are accessed, thereby generating a motion-compensated image in which the global vector is used and a motion-compensated image in which the local vector is used. Then, correlations between the two motion-compensated images and the processing target region R are computed, and the motion-compensated image for which a greater correlation is obtained is blended with the processing target region R in the N frame image.

In this way, with the method in the related art, it is necessary to access the frame memory 9 twice in order to perform motion compensation of one processing target region R. Because of this, the bus bandwidth to the frame memory 9 is overloaded.

In contrast, with this embodiment, because one of the global vector and the local vector is selected before generating a motion-compensated image, the frame memory 9 is accessed just once for each processing target region R. In this way, there is an advantage in that it is possible to reduce overloading of the bus bandwidth by reducing the access traffic to the frame memory 9.

In this embodiment, although whether the local vector or the global vector will be selected is determined on the basis of the confidence of the local vector, alternatively, the determination may be made on the basis of the confidence of the global vector and differences between the global vector and the local vector.

Modifications of the vector selection method will now be described with reference to FIGS. 9 to 12B.

In the example in FIG. 9, there are three discrete motion vectors, for which Vx=5 and Vy=0, in the neighborhood of the processing target region R, and thus, Vx=5 and Vy=0 for the interpolated local vector, and the confidence thereof is 57. On the other hand, Vx=6 and Vy=0 for the global vector, and the confidence thereof is 64. With the vector selection method of the above-described embodiment, because the local-vector confidence is greater than the threshold, 45, the local vector is selected. However, in the example in FIG. 9, the global-vector confidence is high, and the global vector is close to the above-described three discrete motion vectors. Because of this, it is expected that the discrete motion vectors, for which Vx=5 and Vy=0, may be locally aggregated in the neighborhood of the processing target region R due to calculation errors, and thus, the four local vectors and the confidences thereof may not be accurate.

Figure 10A:
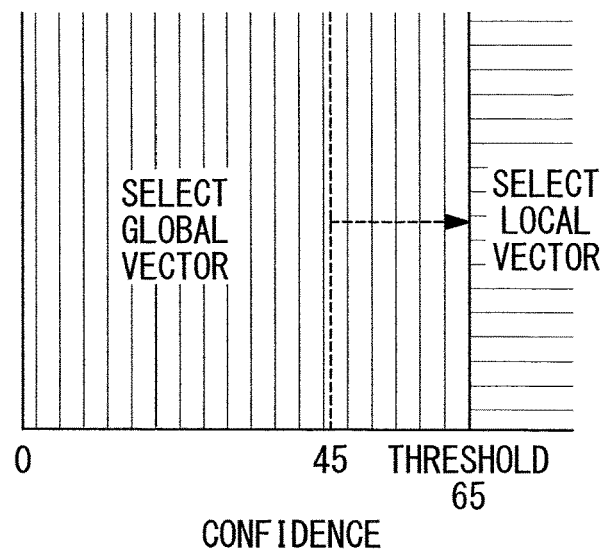
FIG. 10A is a diagram showing the relationship between the local-vector confidence and a vector to be selected in a modification of FIG. 9.

The motion-vector selecting portion 6 calculates, separately for Vx and Vy, absolute values of differences (absolute differences) between the global vector and the local vector. In the example in FIG. 9, the absolute difference for Vx is calculated to be 1, and the absolute difference for Vy is calculated to be 0. As shown in FIG. 10A, the local-vector-threshold setting portion 6a corrects the threshold on the basis of the absolute differences so that the threshold is increased with a decrease in the absolute differences. In the example in FIG. 10A, the threshold is corrected to be 65. By doing so, the local vector is less likely to be selected when the difference between the global vector and the local vector is low. The threshold correction is executed, for example, only when the global-vector confidence is greater than a predetermined value.

By doing so, the influences of calculation errors in the discrete motion vectors on the result of the vector selection by the vector determining portion 6b are reduced, and thus, it is possible to select an appropriate vector.

Figure 11A:
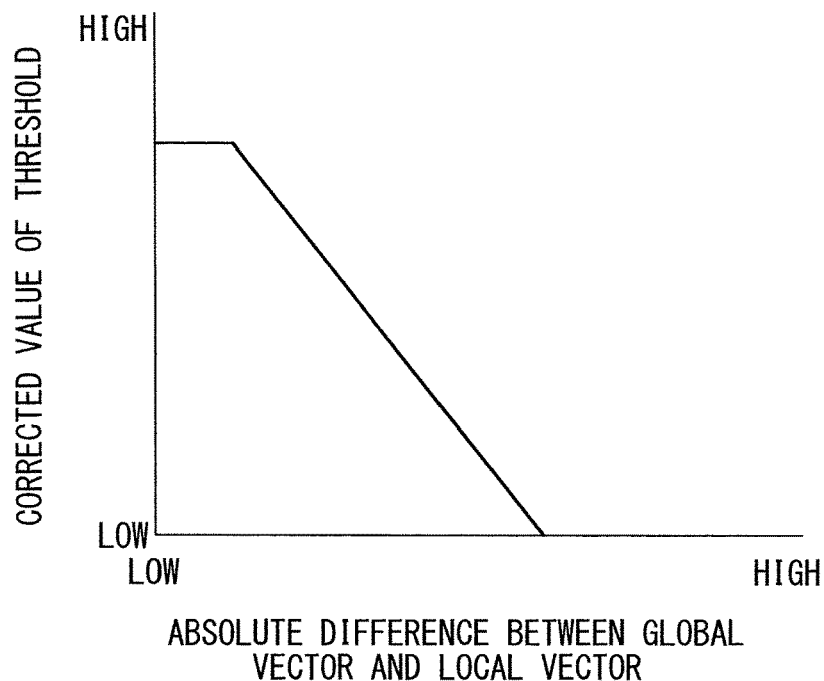
FIG. 11A is a graph showing an example of the correspondence relationship between a threshold and an absolute difference between the global vector and the local vector.
Figure 11B:
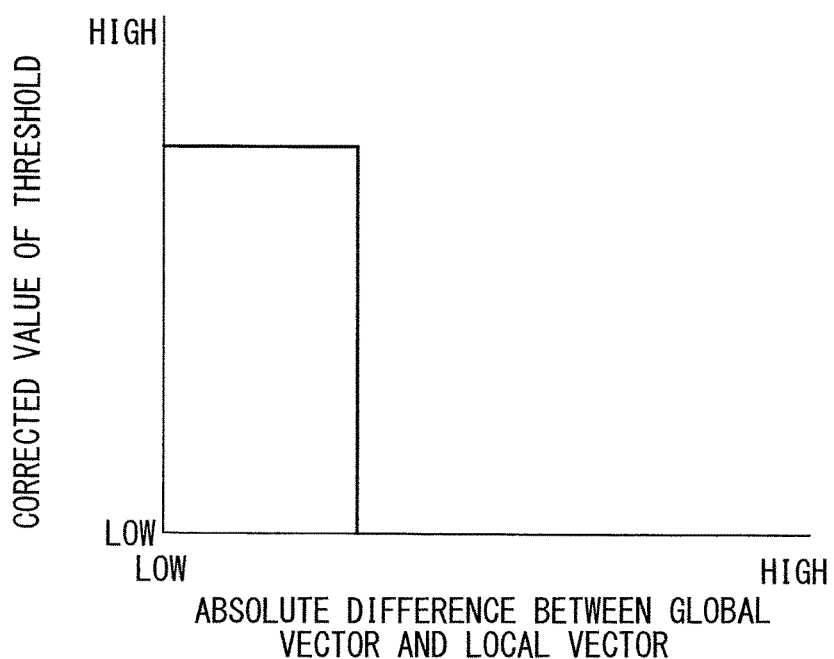
FIG. 11B is a graph showing another example of the correspondence relationship between the threshold and the absolute difference between the global vector and the local vector.

FIGS. 11A and 11B show an examples of the correspondence relationship between the absolute difference and the threshold. For example, as shown in FIG. 11A, the local-vector-threshold setting portion 6a corrects the threshold so as to take a lower value with an increase in the absolute difference. Alternatively, as shown in FIG. 11B, the local-vector-threshold setting portion 6a may correct the threshold in two steps so that, in the case where the absolute difference is equal to or greater than a predetermined value, the threshold becomes lower as compared with the case in which the absolute difference is less than the predetermined value.

Figure 10B:
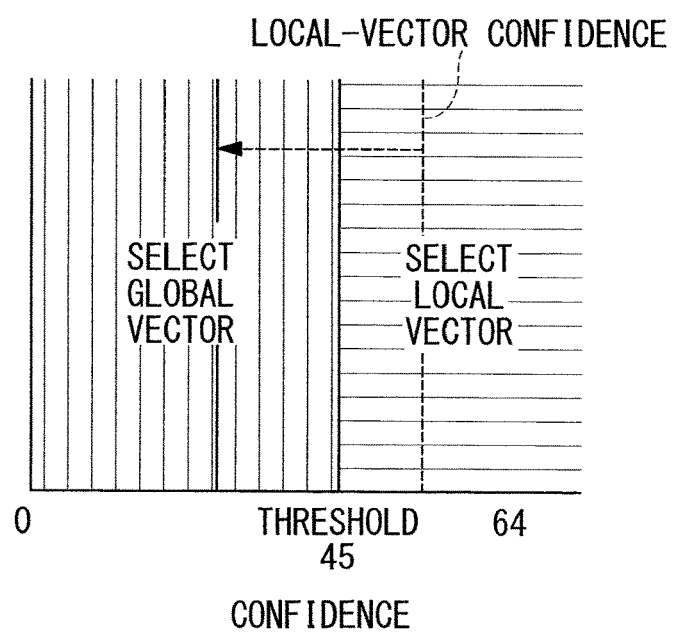
FIG. 10B is a diagram showing another relationship between the local-vector confidence and the vector to be selected in the modification of FIG. 9.

As shown in FIG. 10B, instead of correcting the threshold, the vector determining portion 6b may correct the local-vector confidence on the basis of the absolute difference so that the local-vector confidence is decreased with a decrease in the absolute difference. In the example in FIG. 10B, the vector determining portion 6b corrects the local-vector confidence to be 27 by subtracting an offset value, 30, from the confidence, 57. By doing so also, it is possible to achieve the same effect as that of performing the threshold correction.

Figure 12A:
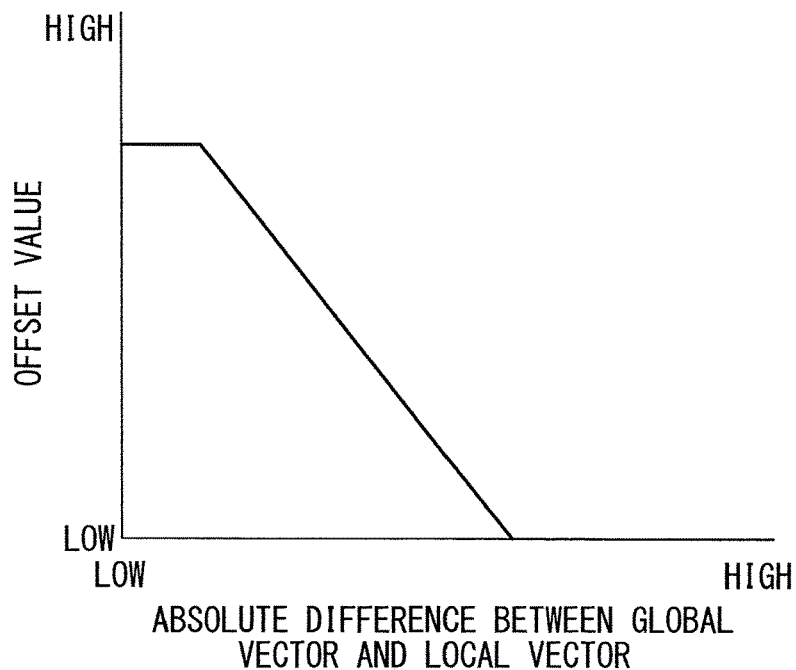
FIG. 12A is a graph showing an example of the correspondence relationship between an offset value with respect to the local-vector confidence and the absolute difference between the global vector and the local vector.
Figure 12B:
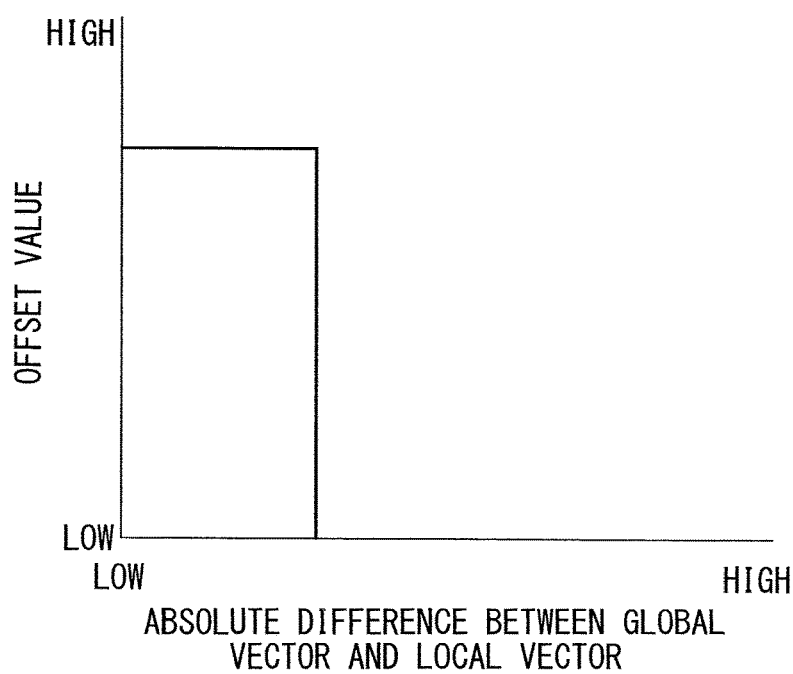
FIG. 12B is a graph showing another example of the correspondence relationship between the offset value with respect to the local-vector confidence and the absolute difference between the global vector and the local vector.

FIGS. 12A and 12B show examples of the correspondence relationship between the absolute difference and the offset value. For example, as shown in FIG. 12A, the vector determining portion 6b sets the offset value to be a lower value with an increase in the absolute difference. Alternatively, as shown in FIG. 12B, the vector determining portion 6b may change the offset value in two steps so that, in the case in which the absolute difference is equal to or greater than the predetermined value, the offset value becomes lower as compared with a case in which the absolute difference is less than the predetermined value.

Multiple types of correspondence relationships may be set so that it is possible to change, in accordance with the image resolution, the above-described correspondence relationships between the absolute difference and the offset value or the corrected value of the threshold. For example, in the examples in FIGS. 11B and 12B, in the case of Full HD, the offset value or the corrected value of the threshold is set so as to be decreased at absolute differences that are equal to or greater than X pixels, and, in the case of 4K, the offset value or the corrected value of the threshold is set so as to be decreased at absolute differences that are equal to or greater than 2X pixels.

In the above-described modifications, although the threshold for the local-vector confidence or the local vector is corrected on the basis of the absolute difference, thereby controlling the vector selection so that an appropriate vector is selected, alternatively, the vector selection may be controlled by means of other means. Other examples of the vector selection method will be described below.

In a first example, the local-vector-threshold setting portion 6a corrects the threshold on the basis of only the global-vector confidence. For example, the local-vector-threshold setting portion 6a corrects the threshold so as to take a greater value in the case in which the global-vector confidence is greater than a predetermined value.

In a second example, the local-vector-threshold setting portion 6a corrects the threshold on the basis of only the magnitude of the global vector. For example, the local-vector-threshold setting portion 6a corrects the threshold so as to take a lower value in the case in which the magnitude of the global vector is greater than a predetermined value, thereby controlling the vector selection so that the global vector is less likely to be selected. The magnitude of the global vector may be the magnitude of Vx or Vy, whichever is greater, or a combined vector of Vx and Vy, that is, Vx+Vy.

A third example is a combination of the first example and the second example, in which the local-vector-threshold setting portion 6a corrects the threshold on the basis of the global-vector confidence and the magnitude thereof. For example, the local-vector-threshold setting portion 6a corrects the threshold on the basis of the global-vector confidence, as in the first example, and subsequently corrects the threshold on the basis of the magnitude of the global vector, as in the second example, thus correcting the threshold in two steps.

In this embodiment and the modifications thereof, although whether the global vector or the local vector will be selected is determined on the basis of the threshold determination for the local-vector confidence, alternatively, the determination may be made on the basis of the threshold determination for the global vector.

In this embodiment, although combining processing for the purpose of performing recursive noise reduction has been described, the purpose of image combining is not limited thereto. For example, it is possible to apply the image-processing apparatus of this embodiment to various types of image combining that requires combining of a processing target region in a standard image and a motion-compensated image positioned with respect to the processing target region, such as multiple-image-combining noise reduction of a still image, or an HDR (High Dynamic Range) or super-resolution image.

As a result, the following aspect is read from the above described embodiment of the present invention.

An aspect of the present invention is an image-processing apparatus that generates a combined image by performing blending of a plurality of images acquired in time series, the image-processing apparatus including: a discrete-motion-vector calculating portion that sets a plurality of discrete measurement regions in a standard image and a reference image that is acquired before the standard image or a combined image generated on the basis of the reference image, and that calculates motion vectors separately for the plurality of measurement regions and confidences of the motion vectors; a global-vector calculating portion that calculates, on the basis of the motion vectors and the confidences thereof calculated by the discrete-motion-vector calculating portion, a global vector that indicates a motion of the standard image as a whole and a confidence of the global vector; a local-vector interpolating portion that calculates, on the basis of the plurality of motion vectors calculated by the discrete-motion-vector calculating portion, a local vector of a processing target region in the standard image; a local-vector-confidence interpolating portion that calculates, on the basis of the confidences of the plurality of motion vectors calculated by the discrete-motion-vector calculating portion, a confidence of the local vector of the processing target region; a motion-vector selecting portion that selects one of the local vector and the global vector on the basis of at least one of the global vector, the global-vector confidence, the local vector, and the local-vector confidence; a motion-compensated-image generating portion that generates, on the basis of the vector selected by the motion-vector selecting portion, a motion-compensated image of the reference image or the combined image corresponding to the processing target region in the standard image; and a blending portion that performs weighted addition of the processing target region in the standard image and the motion-compensated image.

With this aspect, the discrete-motion-vector calculating portion calculates the motion vectors of the plurality of measurement regions that are discretely set in the standard image and the confidences thereof on the basis of the standard image and the reference image; the global vector of the standard image is subsequently calculated by the global-vector calculating portion; and the local vector of the processing target region in the standard image and the confidence thereof are calculated by the local-vector interpolating portion and the local-vector-confidence interpolating portion. Next, one of the global vector and the local vector is selected by the motion-vector selecting portion, and the motion-compensated-image generating portion generates the motion-compensated image on the basis of the reference image or the combined image based on the reference image by using the selected vector. Then, the blending portion performs weighted addition of the processing target region in the standard image and the motion-compensated image, and thus, it is possible to generate a noise-reduced standard image.

In this case, one of the global vector and the local vector is selected before generating the motion-compensated image, and only one motion-compensated image is created for one processing target region. By doing so, it is possible to reduce the access traffic to a frame memory in which the reference image or the combined image is saved.

In the above-described aspect, the motion-vector selecting portion may be provided with: a local-vector-threshold setting portion that sets a threshold for the local-vector confidence; and a vector determining portion that selects the local vector if the local-vector confidence is equal to or greater than the threshold, and selects the global vector if the local-vector confidence is less than the threshold.

By doing so, it is possible to determine whether the local vector or the global vector will be selected by means of a simple threshold determination.

In the above-described aspect, the local-vector-threshold setting portion may set the threshold to be a predetermined value.

By doing so, it is possible to stabilize the vector selection precision.

In the above-described aspect, the local-vector-threshold setting portion may correct the threshold on the basis of the confidence or a magnitude of the global vector or both the confidence and the magnitude of the global vector.

The local vector and the confidence thereof tend to be affected by calculation errors in the motion vectors, whereas the global vector and the confidence thereof are less likely to be affected by the calculation errors in the motion vectors. Therefore, by taking into consideration at least one of the magnitude and the confidence of the global vector, the influences of the calculation errors in the motion vectors or the like on the result of vector selection by the vector determining portion are reduced, and thus, it is possible to select a more appropriate vector.

In the above-described aspect, the local-vector-threshold setting portion may correct the threshold on the basis of the global-vector confidence and a difference between the global vector and the local vector.

By doing so, it is possible to execute an appropriate correction of the threshold by evaluating the accuracy of the local vector on the basis of the global-vector confidence and the difference between the global vector and the local vector.

In the above-described aspect, the vector determining portion may correct the local-vector confidence on the basis of the global-vector confidence and a difference between the global vector and the local vector.

By doing so, it is possible to execute an appropriate correction of the local-vector confidence by evaluating the accuracy of the local vector on the basis of the global-vector confidence and the difference between the global vector and the local vector.

In the above-described aspect, the discrete-motion-vector calculating portion may be provided with: an image-size reducing portion that reduces the sizes of the standard image and the reference image or the combined image; wherein the motion vectors and the confidences thereof are calculated on the basis of the standard image reduced by the image-size reducing portion and the reference image or the combined image reduced by the image-size reducing portion.

By doing so, it is possible to suppress the size of the image data to be saved.

REFERENCE SIGNS LIST 1 image input portion
2 discrete-motion-vector calculating portion
3 global-vector calculating portion
4 local-vector interpolating portion
5 local-vector-confidence interpolating portion
6 motion-vector selecting portion
7 motion-compensated-image generating portion
8 blending portion
9 frame memory
100 image-acquisition system

The invention claimed is:

1. An image-processing apparatus that generates a combined image by performing blending of a plurality of images acquired in time series, the image-processing apparatus comprising:
    a discrete-motion-vector calculating portion that sets a plurality of discrete measurement regions in a standard image and a reference image that is acquired before the standard image or a combined image generated on the basis of the reference image, and that calculates motion vectors separately for the plurality of measurement regions and confidences of the motion vectors;
    a global-vector calculating portion that calculates, on the basis of the motion vectors and the confidences thereof calculated by the discrete-motion-vector calculating portion, a global vector that indicates a motion of the standard image as a whole and a confidence of the global vector;
    a local-vector interpolating portion that calculates, on the basis of the plurality of motion vectors calculated by the discrete-motion-vector calculating portion, a local vector of a processing target region in the standard image;
    a local-vector-confidence interpolating portion that calculates, on the basis of the confidences of the plurality of motion vectors calculated by the discrete-motion-vector calculating portion, a confidence of the local vector of the processing target region;
    a motion-vector selecting portion that selects one of the local vector and the global vector on the basis of at least one of the global vector, the global-vector confidence, the local vector, and the local-vector confidence;
    a motion-compensated-image generating portion that generates, on the basis of the vector selected by the motion-vector selecting portion, a motion-compensated image of the reference image or the combined image corresponding to the processing target region in the standard image; and
    a blending portion that performs weighted addition of the processing target region in the standard image and the motion-compensated image.

2. An image-processing apparatus according to claim 1, wherein the motion-vector selecting portion is provided with:
    a local-vector-threshold setting portion that sets a threshold for the local-vector confidence; and
    a vector determining portion that selects the local vector if the local-vector confidence is equal to or greater than the threshold, and selects the global vector if the local-vector confidence is less than the threshold.

3. An image-processing apparatus according to claim 2, wherein the local-vector-threshold setting portion sets the threshold to a predetermined value.

4. An image-processing apparatus according to claim 3, wherein the local-vector-threshold setting portion corrects the threshold on the basis of the global-vector confidence.

5. An image-processing apparatus according to claim 3, wherein the local-vector-threshold setting portion corrects the threshold on the basis of the magnitude of the global vector.

6. An image-processing apparatus according to claim 3, wherein the local-vector-threshold setting portion corrects the threshold on the basis of the global-vector confidence and the magnitude of the global vector.

7. An image-processing apparatus according to claim 3, wherein the local-vector-threshold setting portion corrects the threshold on the basis of the global-vector confidence and a difference between the global vector and the local vector.

8. An image-processing apparatus according to claim 2, wherein the vector determining portion corrects the local-vector confidence on the basis of the global-vector confidence and a difference between the global vector and the local vector.

9. An image-processing apparatus according to claim 1, wherein the discrete-motion-vector calculating portion is provided with:
- an image-size reducing portion that reduces the sizes of the standard image and the reference image or the combined image;
- wherein the motion vectors and the confidences thereof are calculated on the basis of the standard image reduced by the image-size reducing portion and the reference image or the combined image reduced by the image-size reducing portion.

* * * * *